3,397,183
METHOD FOR PRODUCING CRYSTALLINE ALDEHYDE COPOLYMERS

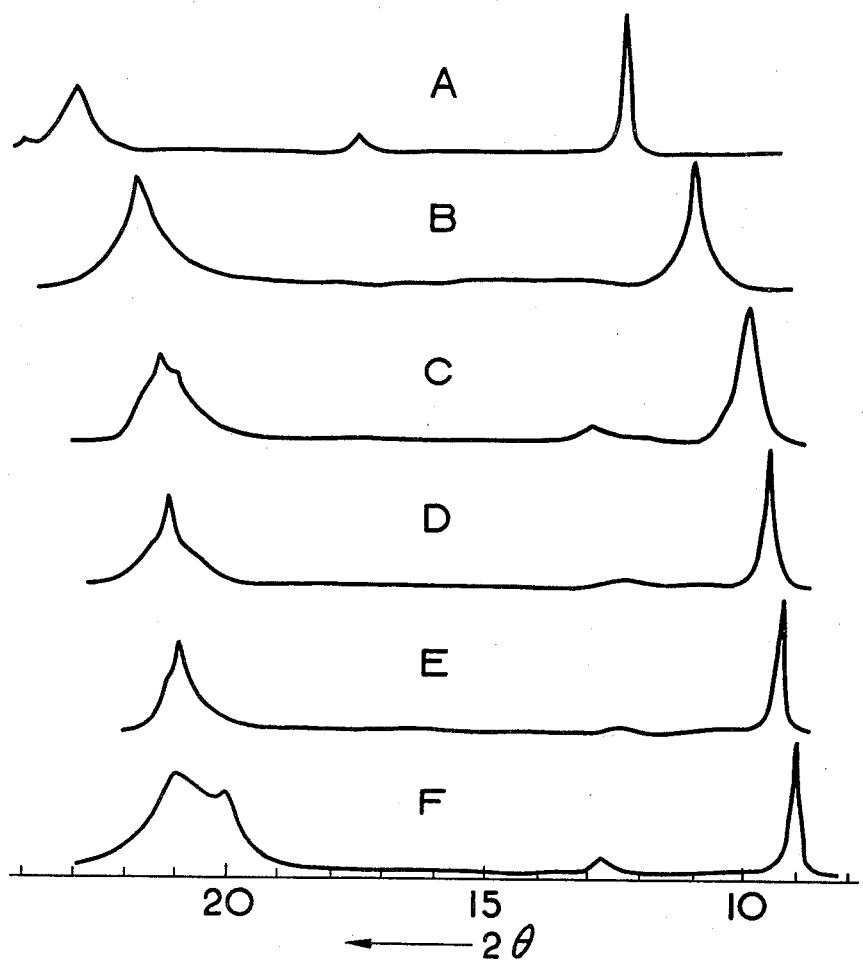
X RAY DIFFRACTION PATTERN OF ALDEHYDE HOMOPOLYMER AND COPOLYMER

Atsushi Tanaka, Iruma-gun, Yukio Hozumi, Oi-mura, Iruma-gun, and Koichi Hatada, Habikino-shi, Osaka-fu, Japan, assignors to Dai Celiu Kabushiki Kaisha, Osaka, Japan
Filed Apr. 20, 1964, Ser. No. 361,198
Claims priority, application Japan, Apr. 30, 1963, 38/22,244
12 Claims. (Cl. 260—67)

ABSTRACT OF THE DISCLOSURE

A method of copolymerizing either two or three aliphatic aldehydes to produce isotactic crystalline aldehyde copolymers wherein the copolymerization is effected in the presence of novel catalysts of the formula $R_mMe(NR'_2)_n$, in which R and R' are alkyl, cycloalkyl or aryl groups, Me is a metal of Groups II and III of the Periodic Table having a valency of $(m+n)$, and $m$ and $n$ are each either 1 or 2.

---

The present invention relates to a process for producing crystalline aldehyde copolymers with good stability by copolymerizing two or three aliphatic aldehydes.

It is well known that crystalline high molecular polymers having polyether structure are produced from aliphatic aldehydes such as formaldehyde, acetaldehyde and the like. It has been established that the polyoxymethylene polymer formed from formaldehyde is a valuable, high molecular weight material after subjecting it to an appropriate stabilizing treatment. The production thereof on a commercial scale has begun. On the other hand, the polymers of higher aliphatic aldehydes, e.g. acetaldehyde, are considerably unstable and it has not yet been discovered how to stabilize them suitably. Therefore, they are not utilized on a commercial scale.

It is because the crystallinity of the polymer is high, and the polymer is hardly soluble in organic solvents and can not be subjected to various treatments, that the stability of a homopolymer of the aliphatic aldehyde is not improved. As the result of studies directed toward increasing the stability by improving the solubility of aldehyde polymer we have completed the present invention.

It has now been found that crystalline aldehyde copolymer having improved solubility may be formed by effecting the polymerization by use of a catalyst of an organometallic compound containing —C—N— bond, represented by the following general formula $$R_mMe(NR'_2)_n$$

(1), wherein R and R' are hydrocarbon residues; Me is a metal belonging to Groups II and III of the Mendeleev Periodic Table having the valency of $(m+n)$; $m$ and $n$ are integers from 1 to 2, respectively.

It is well known that crystalline high polymer may be prepared by use of a catalyst of an organometallic compound or a metal alkoxide from aliphatic aldehydes. Accordingly, it can be easily inferred to copolymerize a mixture of two aldehydes by use of these catalysts. However, investigation has revealed that satisfactory copolymers cannot always be obtained by such a method. For example, by carrying out copolymerization of acetaldehyde and n-butyraldehyde in the presence of a catalyst of diethylzinc, the polymerization velocity is decreased, sufficient amount of copolymers are hardly obtained and no copolymers which are completely soluble in the organic solvents are formed in any composition. When copolymerization is carried out by use of a catalyst composed of trialkylaluminum or aluminum alkoxide, the yield of the produced polymer is more than in the case of diethyl zinc but the solubility of the obtained copolymer is not sufficient. In other words, it is presumed that copolymers with good solubility cannot be readily obtained because of the considerably heterogeneous composition. On the other hand, when copolymerization of aldehydes is carried out by employing a catalyst represented by said general formula, $R_mMe(NR'_2)_n$ of the present invention, copolymers having comparatively homogeneous composition are obtained with high yield. Moreover, copolymers produced in case of some monomer charge ratio (80/20–20/80 molar ratio) are almost completely soluble in organic solvents such as chloroform and toluene etc. and they are valuable in practical use.

It has been found as an important fact that co-polymers produced according to the method of the present invention are special crystalline copolymers of such a novel type as described in F. P. Reding & F. R. Walter, Journal of Polymer Science, 37, 555 (1955); G. Natta, Makromolakulare Chemie 35, 94 (1950); Journal of Polymer Science, 51, 527 (1961), that is to say they are, so-called, isotactic crystalline copolymers formed by monomeric isomorphism. Said phenomenon has not been known except in the case of copolymerization of olefins described in the above literatures and a few cases. With regard to copolymers of aldehydes, finding of such a novel phenomenon has not been reported yet. Generally speaking, these novel crystalline copolymers indicate clearly different X-ray diffraction patterns from those of crystalline homopolymers or that of a mixture of these crystalline homopolymers. The lattice constants of these copolymers vary continuously depending upon the proportion of the two monomers charged. That is an important particular point.

FIG. 1 shows the change of X-ray diffraction patterns in relation to the composition of crystalline copolymers of acetaldehyde and n-butyraldehyde prepared by the method of the present invention. For comparison, FIG. 1 also shows the X-ray diffraction patterns of homopolymers of acetaldehyde and n-butyraldehyde.

In FIG. 1, the X-ray diffraction pattern designated as A is that of acetaldehyde homopolymer. X-ray diffraction patterns designated as B, C, D and E are those of copolymers of acetaldehyde and n-butylraldehyde obtained in the process of this invention in molar ratios 8:2, 6:4, 4:6 and 2:8, respectively. The X-ray diffraction pattern designated as F is that of n-butylraldehyde homopolymer. The formation of such a novel copolymer may be established not only by the change in the X-ray diffraction pattern but also by the fact that absorption bands (about $9.25\mu$ and $10.85\mu$ in infrared spectrum shift continuously or by swelling property to organic solvents or increase of solubility, etc. As the result of examination it has been found that even when copolymerization is carried out by use of a catalyst composed of the said alkyl metallic compound or alkoxide the novel copolymers are partially formed but, as mentioned above, a clear relation cannot be found because of the considerably heterogeneous composition. In a word, the present invention relates to a method for producing co-crystalline copolymer with high yield, which comprises copolymerizing a mixture of at least two aldehydes by use of a catalyst composed of a compound represented by the general formula of $R_mMe(NR'_2)_n$.

Catalysts for the polymerization which may be employed in the present invention include, for example, $C_2H_5MgN(C_6H_5)_2$, $C_2H_5ZnN(C_6H_5)_2$,

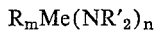

and $(C_2H_5)Al\text{-}(N(C_6H_5)_2)_2$. However, the polymerization catalysts are not limited to the above substances.

Namely, compounds represented by the general Formula 1, wherein R and R' are independently selected from the group consisting of methyl, ethyl, propyl, butyl, amyl, hexyl, heptyl, phenyl, cyclohexyl and benzyl groups and Me is a metal belonging to Groups II and III of the Periodic Table are all included. The amount of the catalyst used is not critical, but it is suitable to add the catalyst in an amount of 0.01 to 10 molar percent on the basis of the aldehyde monomers.

The aliphatic aldehyde monomers employed in the method of the present invention are mixtures of two or three aldehyde monomers selected from aliphatic aldehydes represented by the general formula, R—CHO, wherein R is hydrocarbon group of 1–8 carbon atoms or a halogenated hydrocarbon group. The mixing ratio is within the range of 99/1–1/99 molar ratio of the first component to the second component (in some case the third component may be contained). However, in order to produce copolymers having particularly high solubility and excellent heat stability, it is desirable to carry out copolymerization with mixing ratio of monomers within the range of 80/20–20/80.

When the copolymerization of the present invention is carried out, a solvent is not always necessary, but if it is required to use a solvent it is preferable to use a solvent of hydrocarbon system or ethyl ether system. The polymerization may be carried out at a temperature ranging from 0 to −100° C., but a temperature in the range of from −50° C. to −80° C. is preferable. It is desirable to carry out the polymerization in an inert atmosphere such as nitrogen.

In the present invention, the process of the polymerization is not critical. Any of processes, e.g. a process comprising feeding a freshly distilled aldehyde mixture in the presence of a catalyst dissolved in an inert organic solvent, a process comprising adding a catalyst of the present invention, as it is or as a solution into aldehyde or its solution, and others may be employed.

The present invention is illustrated in detail by the following examples, but they do not limit the scope of the present invention.

Example 1

30 cc. of toluene, 3.52 g. of acetaldehyde and 1.44 g. of n-butyraldehyde were placed in a 100 cc. glass container provided with a stopper and the container was cooled to 78° C. The container was then completely flushed with nitrogen. Then, 0.392 g. of $(C_2H_5)Al[N(C_6H_5)_2]_2$ was dropped into the mixture in a nitrogen stream. The mixture was stirred and allowed to stand at −78° C. After 24 hours, about 50 cc. of ammoniacal methanol (4% ammonia concentration) cooled to −78° C. was added. The temperature was gradually raised to separate the produced polymer in bulky form. The separated polymer was crushed, washed repeatedly with methanol and dried. The yield of the produced polymer was 1.07 g. (21.6% yield) and 94% of the product was completely soluble in toluene. The intrinsic viscosity [η] measured in toluene solution at 30° C. was 8.6. The polymer showed strong peaks at the parts of $2\theta=11.7°$ and $21.9°$ in the X-ray diffraction spectrum and was clear crystalline. When the heat resistance of the polymer was measured, the loss of weight of the produced polymer by heating at 105° C. for 1, 4 and 10 hours, respectively, was 4.7, 9.0 and 18.4%. In comparison with conventional polyacetaldehyde or poly-n-butyraldehyde, the product obtained was very stable.

Example 2

90 cc. of toluene, 13.2 g. of acetaldehyde, and 14.4 g. of n-butyraldehyde were placed in a 300 cc. glass container provided with a stopper. While cooling down to −78° C., the atmosphere in the container was completely flushed with nitrogen. Thereafter, 2.02 g. of $(C_2H_5)_2AlN(C_6H_5)_2$ were added in a nitrogen stream and stirred. Then, after standing at −78° C. for 24 hours, the polymerized material was separated by the same treatment as in Example 1. The yield of the polymeric material was 12.4 g. (the yield 44.9%). The product was completely soluble in toluene. The intrinsic viscosity [η] in a toluene solution at 30° C. was 16.2. The polymeric material showed strong peak at the parts of $2\theta=9.9$ and 21.2 in the X-ray diffraction spectrum. Therefore, the product was crystalline copolymers. The weight loss of the polymer by heating at 105° C. for 10 hours was 8.0% and the polymer had excellent stability.

Example 3

0.51 g. of $(C_2H_5)_2AlN(C_6H_5)_2$ was added to a mixture containing 30 cc. of n-hexane, 10 cc. of toluene, 2.20 g. of acetaldehyde and 2.90 g. of propionaldehyde in the manner of Example 1, and polymerization was carried out at −78° C. for 24 hours. The polymeric material produced was 2.52 g. (49.4% yield). The polymer had strong peaks at the part of $2\theta=11.4$ and 21.6 in the X-ray diffraction spectrum which showed that it had clearly crystallinity. The thusly produced polymer was soluble in chloroform. The weight loss of the polymer by heating at 105° C. for 10 hours was 12.2%. Therefore, the polymer was very stable.

Example 4

6.01 g. of copolymer was produced by the copolymerization of a mixture of 30 cc. of toluene, 2.16 g. of n-butyraldehyde, 7.98 g. of n-heptylaldehyde, and 0.51 g. of $(C_2H_5)_2AlN(C_6H_5)_2$. The copolymer was completely soluble in toluene. According to the X-ray diffraction spectrum, the polymer showed peaks at the parts of $2\theta=20$ (weak) and 8.0 and had very high crystallinity. The intrinsic viscosity [η] of the polymeric material in a toluene solution was 10.7.

Example 5

6.61 g. of polymer was produced from 30 cc. of toluene, 2.16 g. of isobutyraldehyde, 7.98 g. of n-heptyl-aldehyde and 0.75 g. of $(C_2H_5)_2AlN(C_6H_5)_2$ by the procedure of Example 1. The polymer was readily soluble in toluene and showed strong peaks at the parts of $2\theta=7.9$ and 20.0 in the X-ray diffraction spectrum. It showed that the polymer was crystalline.

What we claim is:

1. A method for producing crystalline aldehyde copolymers, said method comprising copolymerizing a mixture of two or three aliphatic aldehydes each of the formula RCHO, wherein R in each of said aldehydes is independently selected from the group consisting of alkyl radicals of 1 to 8 carbon atoms in the presence of a polymerization catalyst consisting of an organometallic compound of the formula $R_mMe[NR'_2]_n$, wherein R and R' are independently selected from the group consisting of methyl, ethyl, propyl, butyl, amyl, hexyl, heptyl, phenyl, cyclohexyl and benzyl groups, Me is a metal element of Groups II and III of the Periodic Table having a valency of $(m+n)$, and $m$ and $n$ are each integers from 1 to 2.

2. A method as claimed in claim 1 wherein when two aldehydes are copolymerized, one of said aldehydes is acetaldehyde and the other of said aldehydes is selected from the group consisting of propionaldehyde, n-butyraldehyde, isobutyraldehyde and n-heptyl aldehyde.

3. A method as claimed in claim 1 wherein when two aldehydes are copolymerized, one of said aldehydes is n-butyraldehyde, and the other of said aldehydes is selected from the group consisting of acetaldehyde, propionaldehyde, isobutyraldehyde and n-heptylaldehyde.

4. A method as claimed in claim 1 wherein the polymerization is effected at a temperature of 0° C. to −100° C.

5. A method as claimed in claim 1 wherein the polymerization is effected at a temperature of −50° C. to −80° C.

6. A method as claimed in claim 1 wherein the catalyst is present in an amount of 0.01–10 mol percent of the mixture of aldehydes.

7. A method as claimed in claim 1 wherein when two aldehydes are copolymerized, said aldehydes are present in a molar ratio of from 99:1 to 1:99.

8. A method as claimed in claim 1 wherein when two aldehydes are copolymerized, said aldehydes are present in a molar ratio of from 80:20 to 20:80.

9. A method as claimed in claim 2 comprising copolymerizing said aldehydes in the presence of an inert solvent selected from the group consisting of toluene and n-hexane.

10. A method as claimed in claim 1 wherein Me is aluminum.

11. A method as claimed in claim 1 wherein the catalyst is $(C_2H_5)_2AlN(C_6H_5)_2$.

12. A method as claimed in claim 1 wherein the catalyst is $(C_2H_5)Al[N(C_6H_5)_2]_2$.

References Cited

UNITED STATES PATENTS

| | | | |
|---|---|---|---|
| 3,278,635 | 11/1966 | Bastian | 260—67 |
| 3,305,530 | 2/1967 | Warren | 260—67 |
| 3,132,141 | 5/1964 | Rebaudo | 260—67 |
| 3,252,937 | 5/1966 | Natta et al. | 260—67 |
| 3,272,778 | 9/1966 | Ishida | 260—67 |

FOREIGN PATENTS 1,275,561   10/1961   France.

WILLIAM H. SHORT, *Primary Examiner.*

L. M. PHYNES, *Assistant Examiner.*